(12) United States Patent
Ikeno et al.

(10) Patent No.: US 6,466,648 B1
(45) Date of Patent: Oct. 15, 2002

(54) REPETITIVE CALL CONTROL METHOD, SWITCH USING THE METHOD, AND RECORDING MEDIUM STORING REPETITIVE CALL CONTROL PROGRAM

(75) Inventors: Yasunori Ikeno; Katsuhisa Satoh; Toshiaki Kobayashi, all of Yokohama; Masayuki Honma, deceased, late of Yokohama, all of (JP), by Masaharu Honma, legal representative

(73) Assignee: Fujitsu Limited, Kawasaki (JP)

( * ) Notice: Subject to any disclaimer, the term of this patent is extended or adjusted under 35 U.S.C. 154(b) by 78 days.

(21) Appl. No.: 09/692,658

(22) Filed: Oct. 19, 2000

(30) Foreign Application Priority Data

Dec. 9, 1999 (JP) .......................................... 11-350491

(51) Int. Cl.⁷ .......................... H04M 1/24; H04M 15/00
(52) U.S. Cl. ................. 379/9; 379/12; 379/14; 379/16; 379/32.02; 379/112.04; 379/112.09
(58) Field of Search ........................ 379/1.01, 9, 9.01, 379/14, 12, 15.01, 16, 17, 22, 32.01, 32.02, 111, 112.04, 112.09, 112.1, 209.01, 220.01, 221.01, 232; 370/229, 237

(56) References Cited

U.S. PATENT DOCUMENTS

| | | | | |
|---|---|---|---|---|
| 5,881,132 A | * | 3/1999 | O'Brien et al. ............... | 379/35 |
| 5,898,681 A | * | 4/1999 | Dutta .......................... | 370/229 |
| 6,014,567 A | * | 1/2000 | Budka ........................ | 455/453 |
| 6,049,541 A | * | 4/2000 | Kerns et al. ................. | 370/365 |
| 6,064,653 A | * | 5/2000 | Farris ......................... | 370/237 |

FOREIGN PATENT DOCUMENTS

| JP | 2-234553 | 9/1990 |
|---|---|---|
| JP | 8-274875 | 10/1996 |

* cited by examiner

Primary Examiner—Curtis Kuntz
Assistant Examiner—Quoc D. Tran
(74) Attorney, Agent, or Firm—Katten Muchin Zavis Rosenman

(57) ABSTRACT

A switch includes a repetitive call detection unit which detects a repetitive call which occupies channels in an identical channel group. A release unit releases the channels occupied by the repetitive call when the repetitive call is detected. A restriction unit stores information concerning the repetitive call and imposes a restriction on a connection of a call having information identical to the information concerning the repetitive call. A test unit determines whether a cause of the repetitive call has been removed. A restriction release unit releases the above restriction in accordance with a result of determination by the test unit.

14 Claims, 19 Drawing Sheets

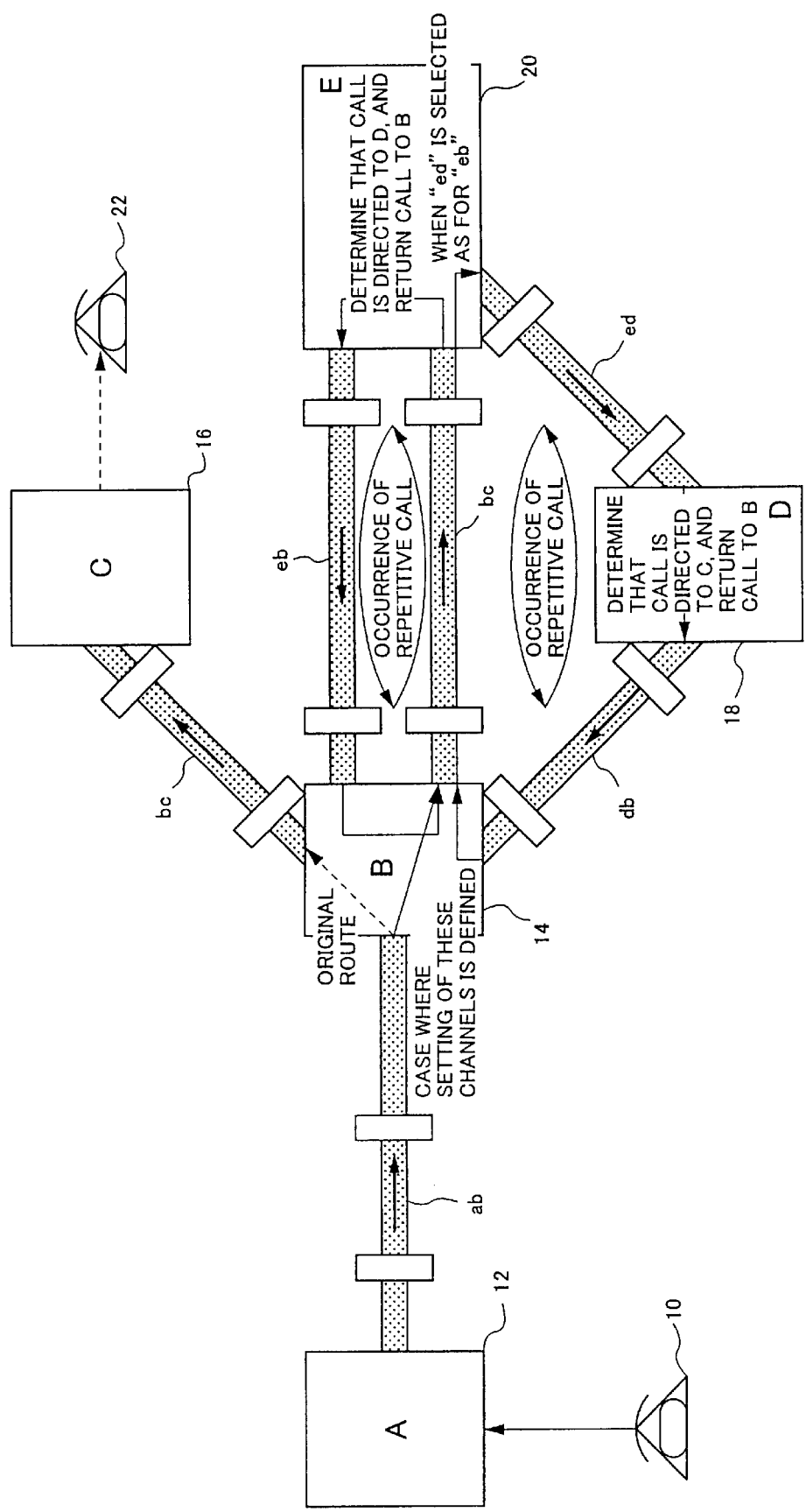

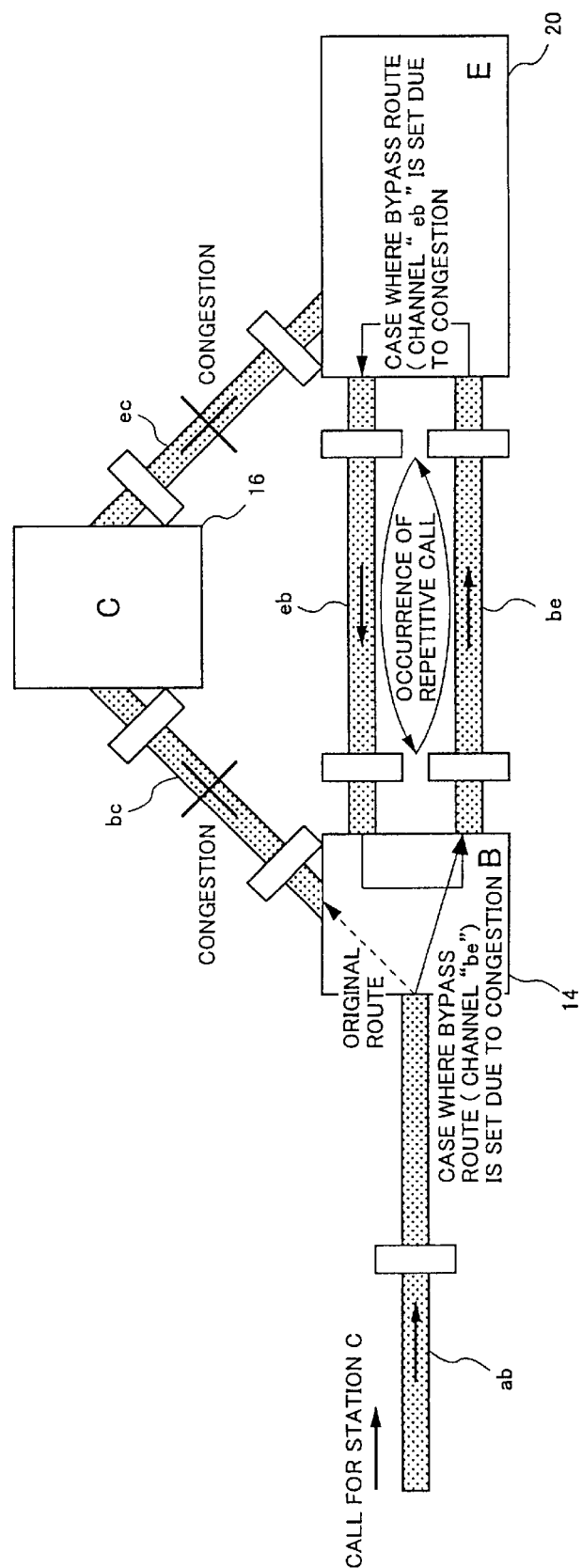

FIG.3B

| OUTGOING/INCOMING | INCOMING CHANNEL ab | INCOMING CHANNEL eb |
|---|---|---|
| OUTGOING CHANNEL bc | ALLOWED | ALLOWED |
| OUTGOING CHANNEL be | ALLOWED | RESTRICTED |

FIG.4B

| OUTGOING CHANNEL / CALL TYPE | INTERNATIONAL CALL | LONG-DISTANCE CALL | LOCAL CALL |
|---|---|---|---|
| OUTGOING LINE "be" | 20% | 50% | 30% |

FIG.10

| | CALLING SUBSCRIBER NUMBER (1) | CECEIVED NUMBER (1) | REQUEST TIME (1) | ADDITIONAL INFORMATION (1) |
|---|---|---|---|---|
| INFORMATION ON CALL 1 | CALLING SUBSCRIBER NUMBER (1) | CECEIVED NUMBER (1) | REQUEST TIME (1) | ADDITIONAL INFORMATION (1) |
| INFORMATION ON CALL 2 | CALLING SUBSCRIBER NUMBER (2) | CECEIVED NUMBER (2) | REQUEST TIME (2) | ADDITIONAL INFORMATION (2) |
| INFORMATION ON CALL 3 | CALLING SUBSCRIBER NUMBER (3) | CECEIVED NUMBER (3) | REQUEST TIME (3) | ADDITIONAL INFORMATION (3) |
| ⋮ | | | | |
| INFORMATION ON CALL n | CALLING SUBSCRIBER NUMBER (n) | CECEIVED NUMBER (n) | REQUEST TIME (n) | ADDITIONAL INFORMATION (n) |

DATA MODIFIED BY SYSYTEM STANDARD DATA OR MAINTENANCE COMMAND

| THRESHOLD VALUE OF DETECTION TIME |
|---|

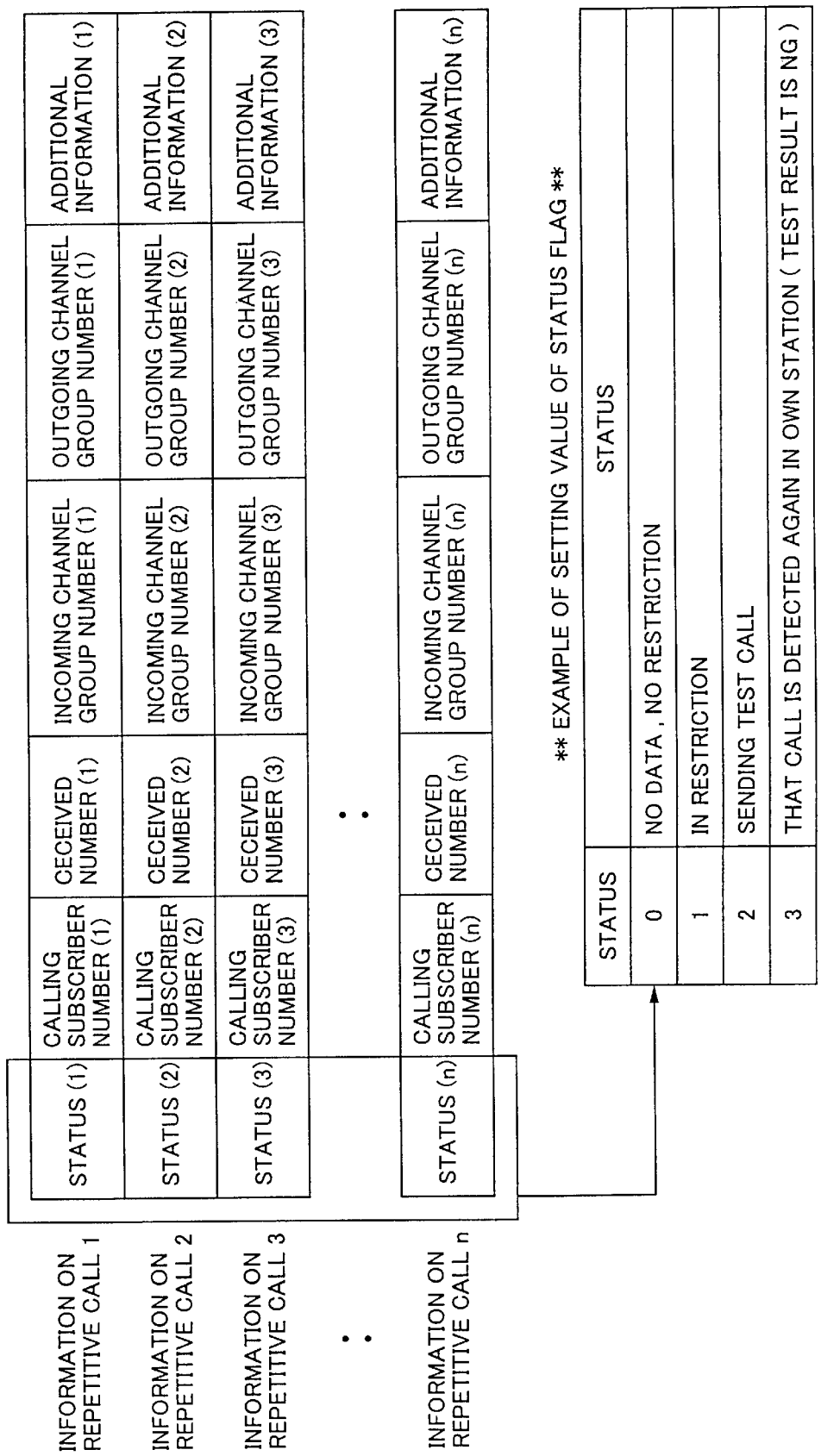

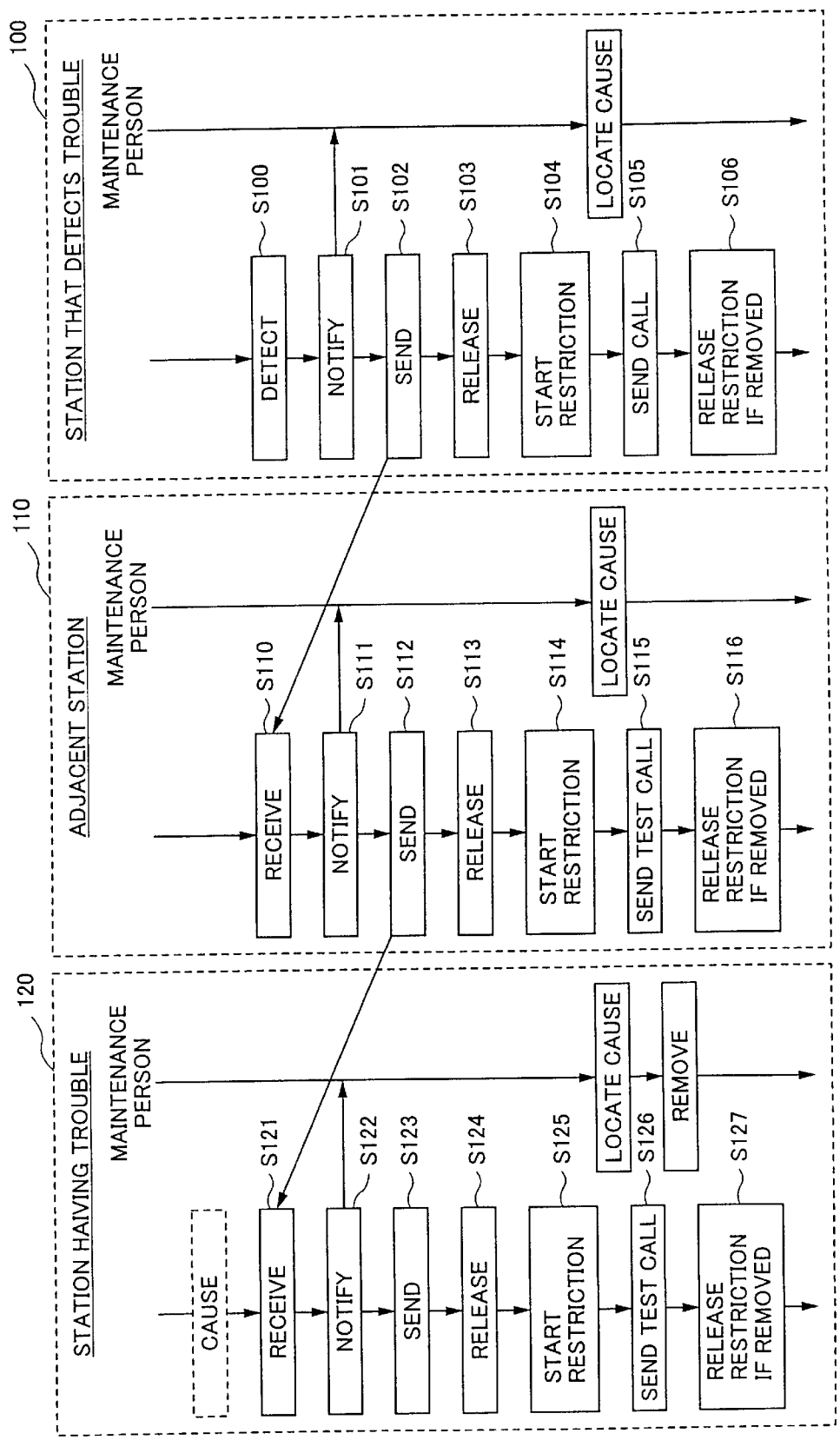

REPETITIVE CALL CONTROL METHOD, SWITCH USING THE METHOD, AND RECORDING MEDIUM STORING REPETITIVE CALL CONTROL PROGRAM

BACKGROUND OF THE INVENTION

1. Field of the Invention

The present invention relates to a repetitive call control method, a switch using the method, and a recording medium storing repetitive call control program. More particularly, the present invention is concerned with detection and control of a repetitive call that occurs in a network including a switch.

2. Description of the Related Art

Recently, a switch network is constructed by mutual connections of common carriers. Each switch station included in the switch network performs setting of an outgoing path for determining a route through which a call passes. All switch stations in the switch network should be synchronized with each other with regard to the setting of outgoing paths.

In order to change the route through which the call passes, all the switch stations of different carriers are required to concurrently change the setting of outgoing paths. If the concurrent change does not take place, an asynchronous situation will occur in which the setting of outgoing paths does not match among the switch stations. When a bypass route is used to transmit the call, a complex procedure for setting of call outgoing paths must be performed in the switch stations of the carriers. Thus, there is a possibility that an error in setting of outgoing paths may occur. An error in setting of an outgoing path may cases a repetitive call in which a call occupies channels in an identical channel group in the switch network.

FIG. 1 is a diagram illustrating a mechanism of occurrence of a repetitive call. There is an error in setting of an outgoing path (channel) in a station (B) 14. The station 14 erroneously sets a channel "be" with respect to a call directed to a station (C) 16 and initiated by a station (A) 12. When a calling subscriber 10 calls a destination subscriber 22, the station 14 erroneously sets the channel "be" although originally the station 14 should set an outgoing channel "bc". A station (E) 20 determines that the call should be addressed to the station 16, and sets an outgoing channel "eb".

Thus, a group of channels "be" and "eb" are constantly used by a repetitive call, so that a congestion of channels "be" and "eb" occurs. If a station (D) 18 is available as a bypass route in a case where the channel "eb" is congested, channels "ed" and "db" will be congested by a repetitive call.

If an error in the setting of a bypass route, a repetitive call may occur in the switch network. FIG. 2 shows another example of occurrence of a repetitive call. Referring to FIG. 2, it is assumed that a first outgoing channel for a call from the station 14 to the station 16 is "bc", a second outgoing channel is "be" and that a first outgoing channel for a call from the station 20 to the station 16 is "ec" and a second outgoing channel is "eb".

If the channels "bc" and "ec" are congested, the stations 14 and 20 will set the second outgoing channels as those for forming bypass routes. If the station 14 initiates a call directed to the station 16, a group of channels "be" and "eb" is constantly used by a repetitive call until the channels "bc" and "ec" are recovered from the congested states. Thus, the channels "be" and "eb" will be congested.

FIGS. 3A and 3B show a conventional method for resolving the problem of the repetitive call. A switch network shown in FIG. 3A includes a table shown in FIG. 3B. For example, the station 14 is equipped with the table shown in FIG. 3B. The table describes information indicating whether an outgoing channel is allowed to be connected to an incoming channel via which a call is transferred.

In a case where channel "eb" is an incoming channel of the station 14 and "be" is an outgoing channel thereof, the station 14 prevents the call from the channel "eb" to be output to the channel "be" again.

FIGS. 4A and 4B show another conventional method for resolving the problem of the repetitive call. The station 14 in a network shown in FIG. 4A is equipped with a table shown in FIG. 4B. The table shown in FIG. 4B describes information the ratio of occupation in an outgoing channel for each call type.

If the type of a call over incoming channel "ab" to the station 14 differs from that of a call over incoming channel "eb", outgoing channel "be" is not occupied by one of the two incoming channels "ab" and "eb" even if a repetitive call occurs. Thus, even in a case where a loop is formed between the stations 14 and 20, a group of the channels "be" and "eb2" is not occupied by the repetitive call, so that the channels "be" and "eb" can be prevented from being congested.

However, the methods for controlling the repetitive call shown in FIGS. 3A, 3B and FIGS. 4A and 4B are not capable of detecting occurrence of a repetitive call in real time. That is, the maintenance person predicts occurrence of a repetitive call and takes measures against occurrence of a repetitive call and spreading of an unwanted situation. In practice, it is very difficult to seize a situation of occurrence of a repetitive call and look into a cause thereof.

More particularly, the repetitive call controlling method shown in FIGS. 3A and 3B does not cope with a repetitive call coming from a channel which is not registered in the table shown in FIG. 3B. If information indicating whether a connection should be made is registered with respect to all incoming and outgoing channels, the switch stations will be needed to have increased inner resources such as a CPU and a memory. In addition, it is required to process a huge amount of data for setting outgoing channels so that maintenance cannot be performed reliably.

The repetitive call controlling method as shown in FIGS. 4A and 4B determines the ratio of occupation for each call type in advance. Thus, the method does not have wide applicability to various networks and does not utilize the channels efficiently.

As yet another means for controlling repetitive calls, it may be possible to integrally manage information concerning setting of outgoing channels and the current situation in real time. An intelligent network is equipped with means as described above. However, the means does not acknowledge, as a problem, a repetitive call resulting from a situation in which the setting of a bypass route is erroneously set, as shown in FIG. 2 because information itself concerning setting of an outgoing channel does not have any problem.

SUMMARY OF THE INVENTION

It is a general object of the present invention to provide a repetitive call control method and a switch using the method.

A more specific object of the present invention is to provide a repetitive all control method and a switch using the method capable of automatically detecting and imposing a restriction on a repetitive call and preventing occurrence of a congested situation.

The above objects of the present invention are achieved by a switch comprises: a repetitive call detection unit which detects a repetitive call which occupies channels in an identical channel group; a release unit which releases the channels occupied by the repetitive call when the repetitive call is detected; a restriction unit which stores information concerning the repetitive call and imposes a restriction on a connection of a call having information identical to the information concerning the repetitive call; a test unit which determines whether a cause of the repetitive call has been removed; and a restriction release unit which releases the above restriction in accordance with a result of determination by the test unit.

The above objects of the present invention are also achieved by a method comprising the steps of: detecting a repetitive call which occupies channels in an identical channel group; releasing the channels occupied by the repetitive call when the repetitive call is detected; storing information concerning the repetitive call and imposing a restriction on a connection of a call having information identical to the information concerning the repetitive call; determining whether a cause of the repetitive call has been removed; and releasing the above restriction in accordance with a result of determination by the test unit.

According to the above-mentioned switch and method, it is possible to drastically reduce the number of channels occupied by a repetitive call and to prevent the system from being congested. Further, it is possible to impose a restriction on a connection of a call similar to a repetitive call.

The switch may be configured so that it further comprises a notify unit which notifies given positions of associated stations of information concerning the repetitive call detected. Thus, it is possible to automatically notify maintenance persons or the like involved in their own station or an adjacent station of information concerning the repetitive call. Thus, these stations can share information concerning the repetitive call, so that a cause of the repetitive call can efficiently be removed.

The above switch may be configured so that the repetitive call detection unit comprises: a first unit which reads call information concerning calls that use the channels from a given table; and a second unit which compares the call information read with call information concerning a current call and determines whether the given table defines a call having call information identical to that of the current call, and wherein, if it is determined that the given table defines a call having call information identical to that of the current call, the current call is acknowledged as a repetitive call. Thus, it is possible to efficiently detect the repetitive call.

The switch may be configured to so that the repetitive call detection unit comprises: a first unit which reads call information concerning calls that use the channels from a given table; and a second unit which compares the call information read with call information concerning a current call and determines whether the given table defines a call having call information identical to that of the current call, and wherein, if it is determined that the given table defines a call having call information identical to that of the current call, the current call is acknowledged as a repetitive call in a case where a time interval between a time when said call having identical call information defined in the table occurs and a time when said current call occurs is equal to or shorter than a given time interval. Thus, it is possible to accurately detect the repetitive call.

The switch may be configured so that if it is determined that the current call is a repetitive call, the repetitive call detection unit registers the call information concerning the current call in the given table. Thus, it is possible to impose a restriction on a call having call information identical to that of the repetitive call registered in the given table.

The switch may be configured so that the test unit comprises: a test call generating unit generating a test call having call information identical to that of the repetitive call at given intervals; a test call sending unit sending the test call to a network to which the switch is connected; and a determination unit which determines that a cause of the repetitive call has not yet been removed if the test call is received before a predetermined time elapses and which determines that the cause of the repetitive call has been removed if the test call is not received before the predetermined time elapses. Thus, it is possible to easily and accurately determine whether a cause of the repetitive call has been eliminated.

The switch may be configured so that the determination unit comprises: a first unit which registers information concerning a situation in which the cause of the repetitive call has not yet been removed if the test call is received before the predetermined time elapses; and a second unit which deletes the call information concerning the repetitive call from the given table if the test call is not received before the predetermined time elapses. It is thus possible to efficiently manage the repetitive call.

BRIEF DESCRIPTION OF THE DRAWINGS

Other objects, features and advantages of the present invention will become more apparent from the following detailed description when read in conjunction with the accompanying drawings, in which:

FIG. 1 is a diagram showing a mechanism of occurrence of a repetitive call;

FIG. 2 is a diagram showing another mechanism of occurrence of a repetitive call;

FIGS. 3A and 3B are diagrams of a conventional repetitive call control method;

FIGS. 4A and 4B are diagrams of another conventional repetitive call control method;

FIG. 10 is a diagram of an information management table referred to in the process shown in FIG. 9;

FIG. 11 is a diagram of a repetitive call management table;

FIG. 16 is a sequence diagram of an operation of the switch according to the embodiment of the present invention.

DESCRIPTION OF THE PREFERRED EMBODIMENTS

Figure 3A:
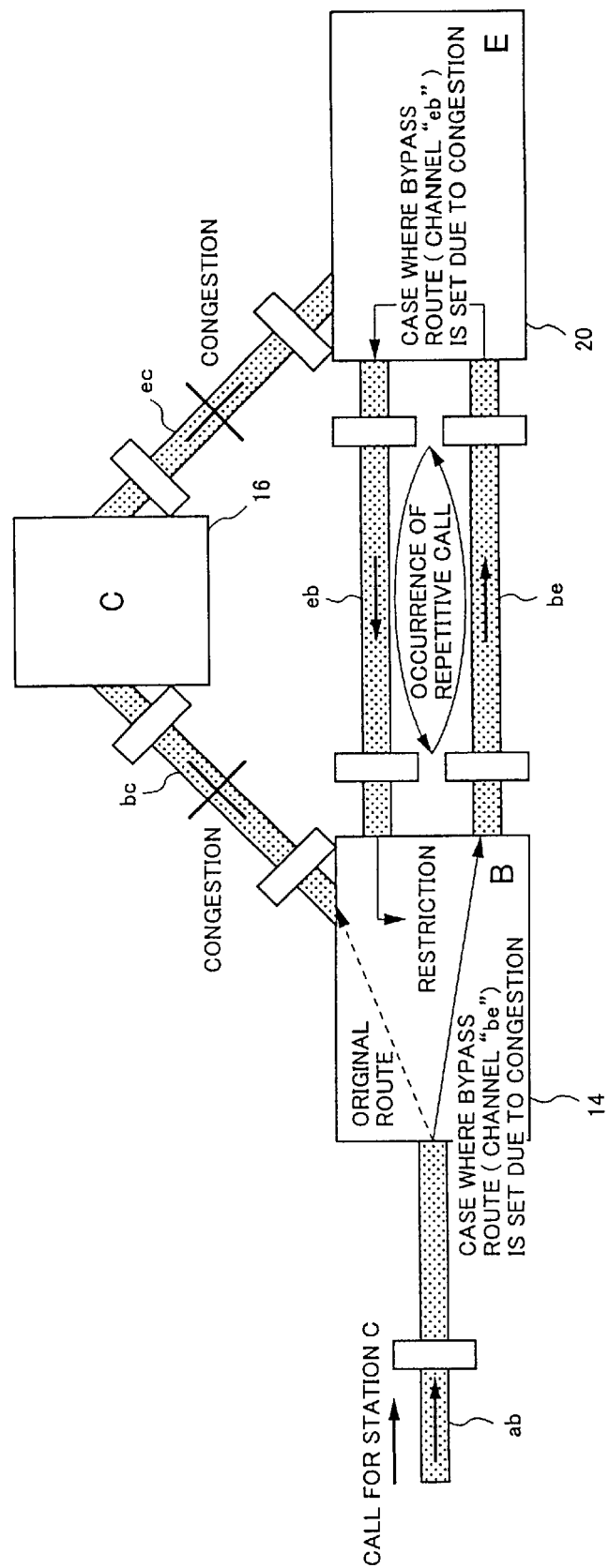
Figure 4A:
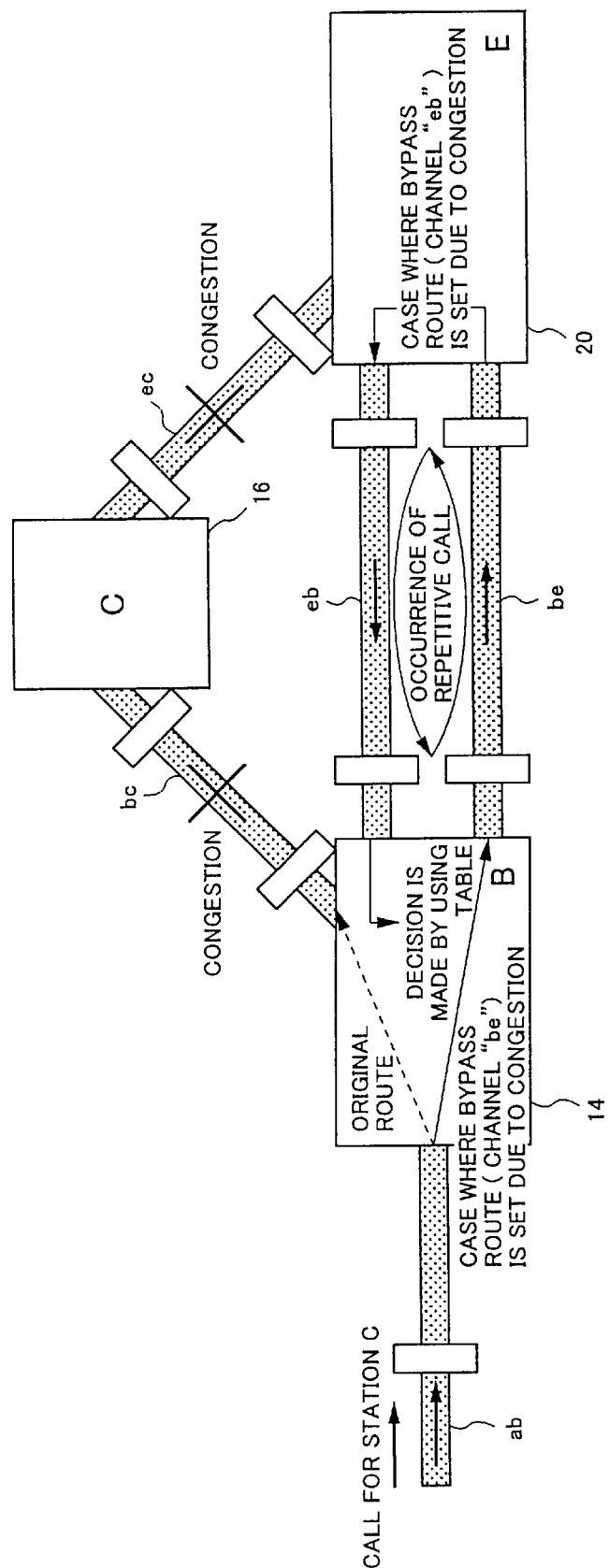
Figure 5:
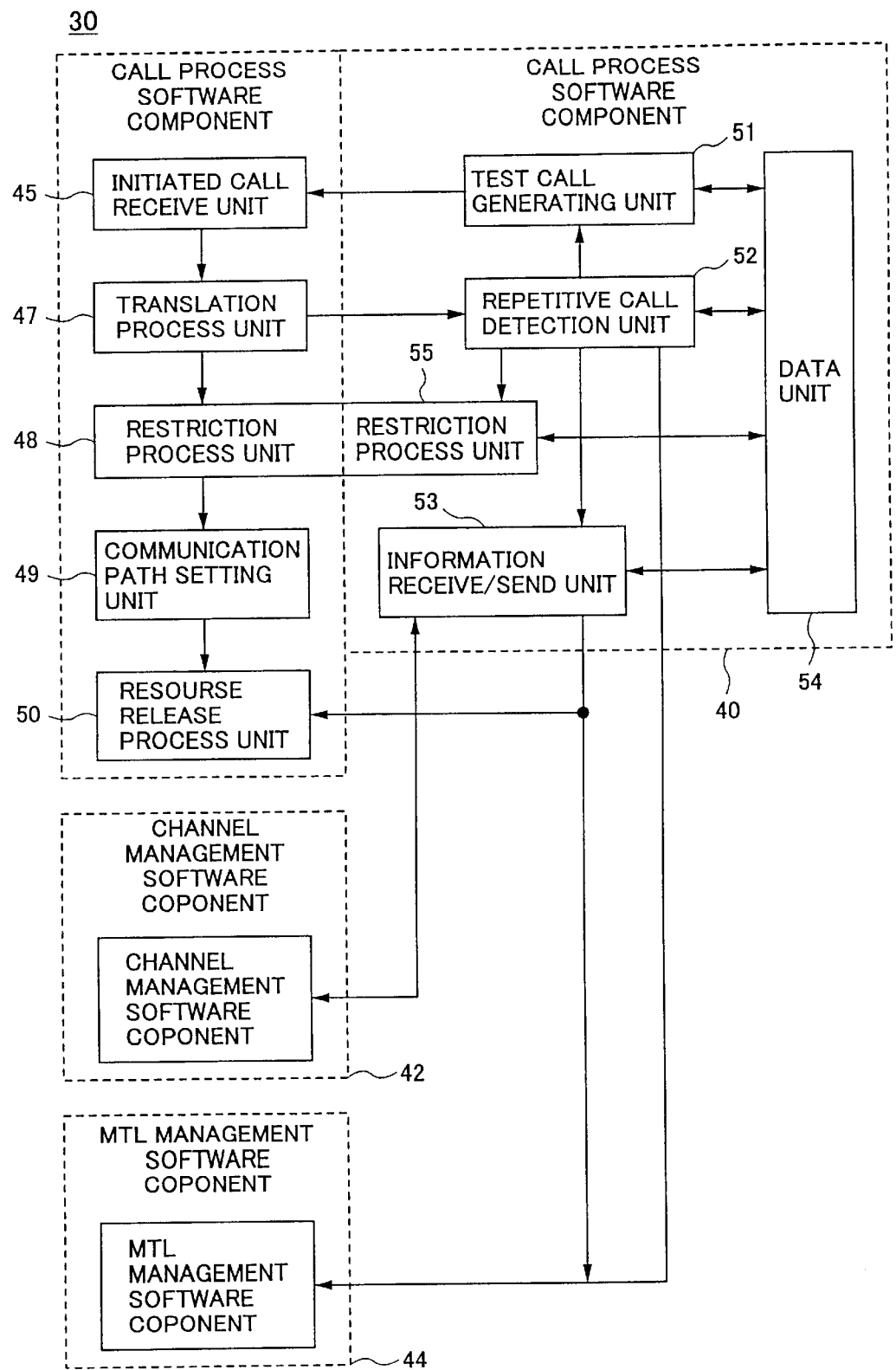
FIG. 5 is a block diagram of a switch according to an embodiment of the present invention.

FIG. 5 is a block diagram of a switch according to an embodiment of the present invention. A switch 30 shown in FIG. 5 includes a call process software component 40, a channel management software component 42, and an MTL management software component 44.

The call process software component 40 includes an initiated call receive unit 46, a translation process unit 47, a restriction process unit 48, a communication path setting unit 49, a resource release process unit 50, a test call generating unit 51, a repetitive call detection unit 52, information receive/send unit 53, a data storage unit 54, and a restriction process unit 55. The switch 30 can be implemented by adding, to the existing call process software component, the test call generating unit 51, the repetitive call detection unit 52, the information receive/send unit 53, the data storage unit 54 and the restriction process unit 55.

Next, a description will be given of each unit. The initiated call receive unit 46 detects a call from a subscriber or an incoming channel. The translation process unit 47 translates the received number into an internal process number. The restriction process unit 48 imposes a restriction based on the class of the calling subscriber. The communication path setting unit 49 sets a communication path and makes a connection thereon in accordance with the result of the translation. The resource release process unit 50 releases the channels and resources used for communication.

The test call generating unit 51 automatically generates a call similar to a questioned call. The repetitive call detection unit 52 determines whether the call is a repetitive call by referring to the result of the translation. The restriction process unit 55 imposes a restriction on a request for reconnection of the questioned call. The data storage unit 54 stores information necessary for determining whether the call is a repetitive call or an ordinary call, and information on the questioned call. The information receive/send unit 53 sends out, to another station, information concerning a repetitive call received from another station and information concerning a repetitive call detected by the present station, and notifies the involved maintenance person of the information.

The channel management software component 42 manages and control of the states of channels. The MTL management software component 44 manages an input/output interface with the maintenance person.

The switch thus structured has a repetitive call detection function, a trouble notify/receive function, a function of releasing an improperly used resource, a call restriction function for recurrence, a network test function, and an automatic restriction release function.

A further description will be given of the functions mentioned above.

Figure 6:
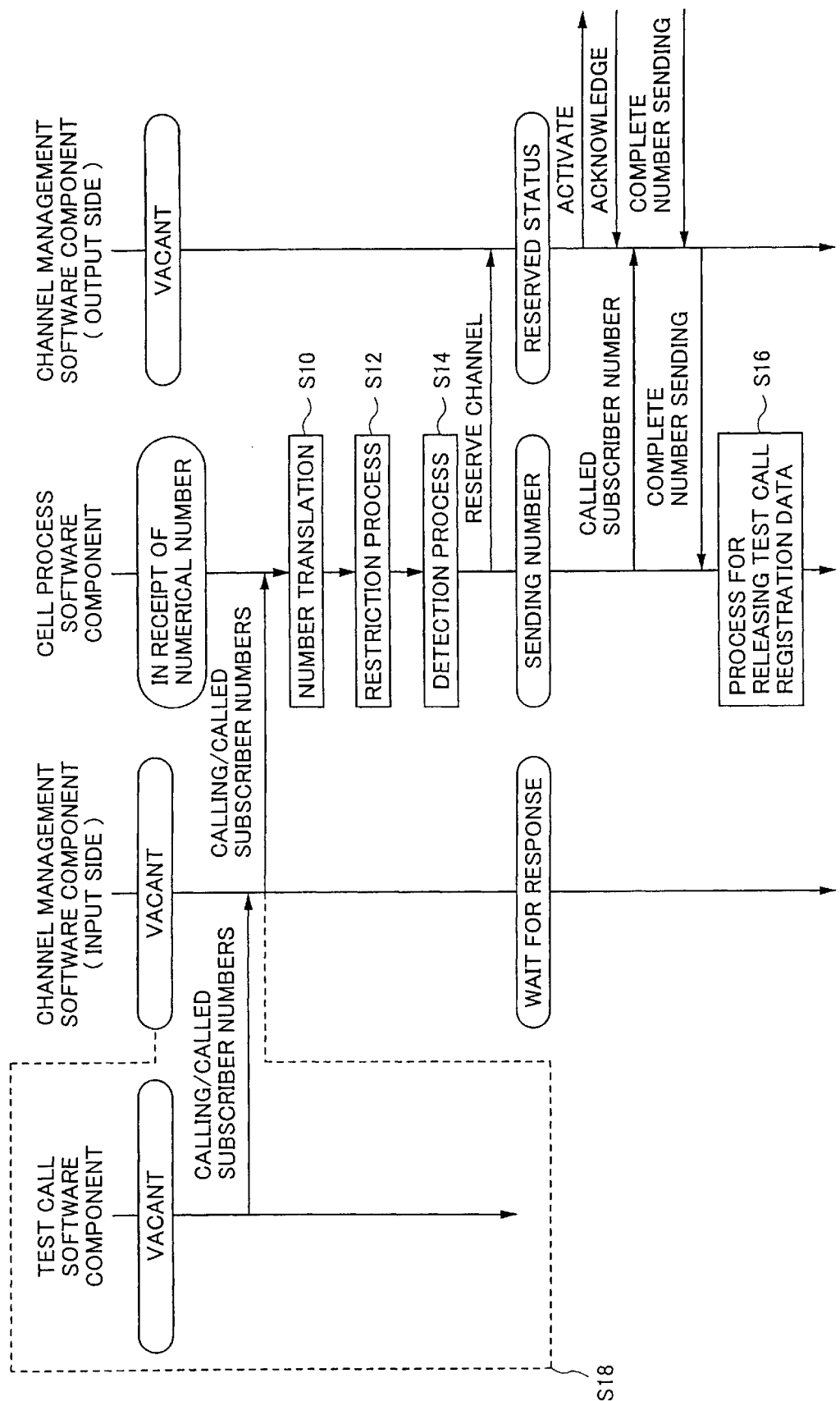
FIG. 6 is a sequence diagram of a conventional process and a process according to the embodiment of the present invention.

The repetitive call detection function detects a repetitive call questioned, and stores information thereon. FIG. 6 is a sequence diagram showing a relationship between a conventional process and a process of the embodiment of the present invention.

The repetitive call detection function can be realized by newly providing a repetitive call detection process to be executed at step S14 after a number translation process executed by the translation process unit 47 at step S10.

Figure 7:
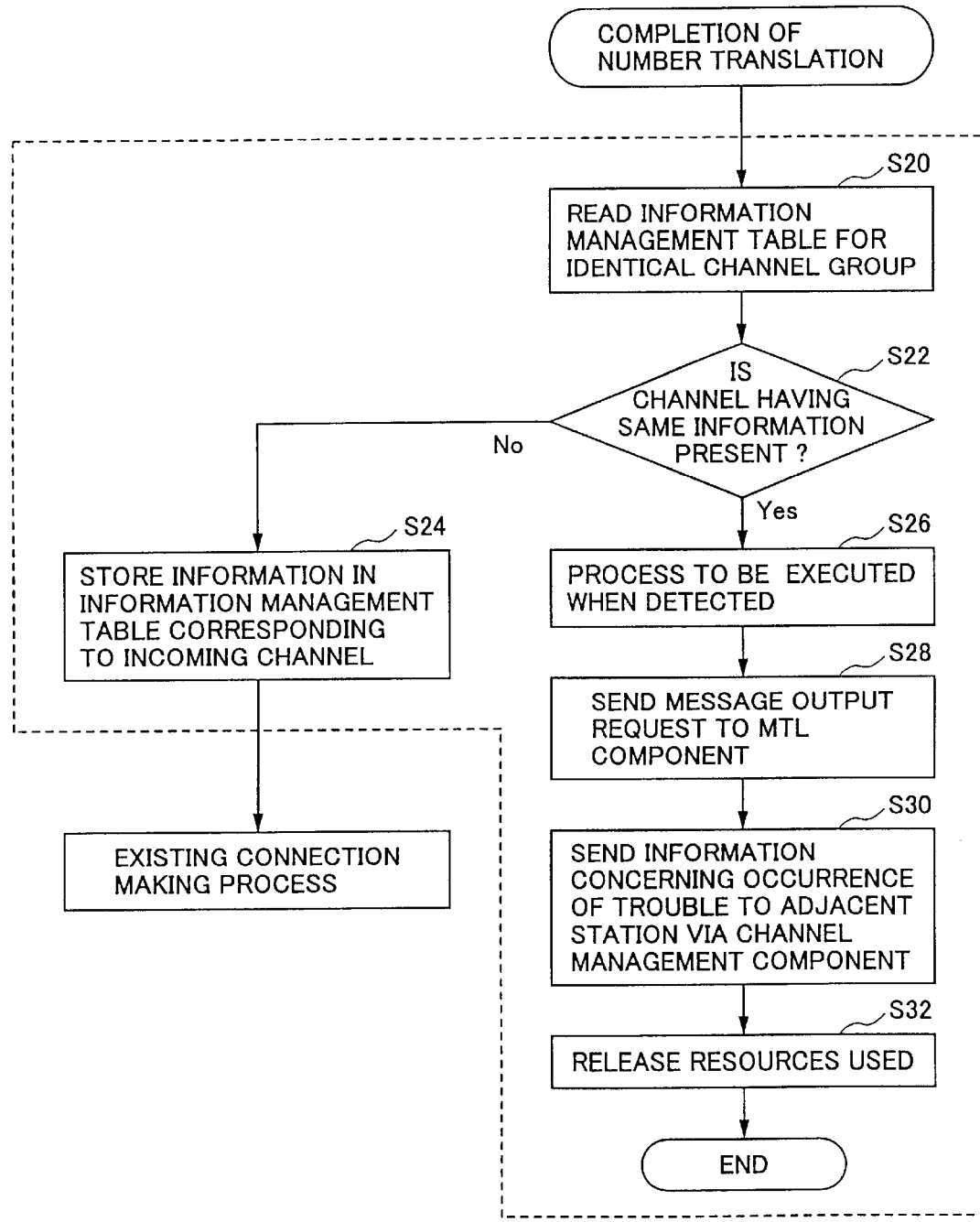
FIG. 7 is a flowchart of a repetitive call detection process.
Figure 8:
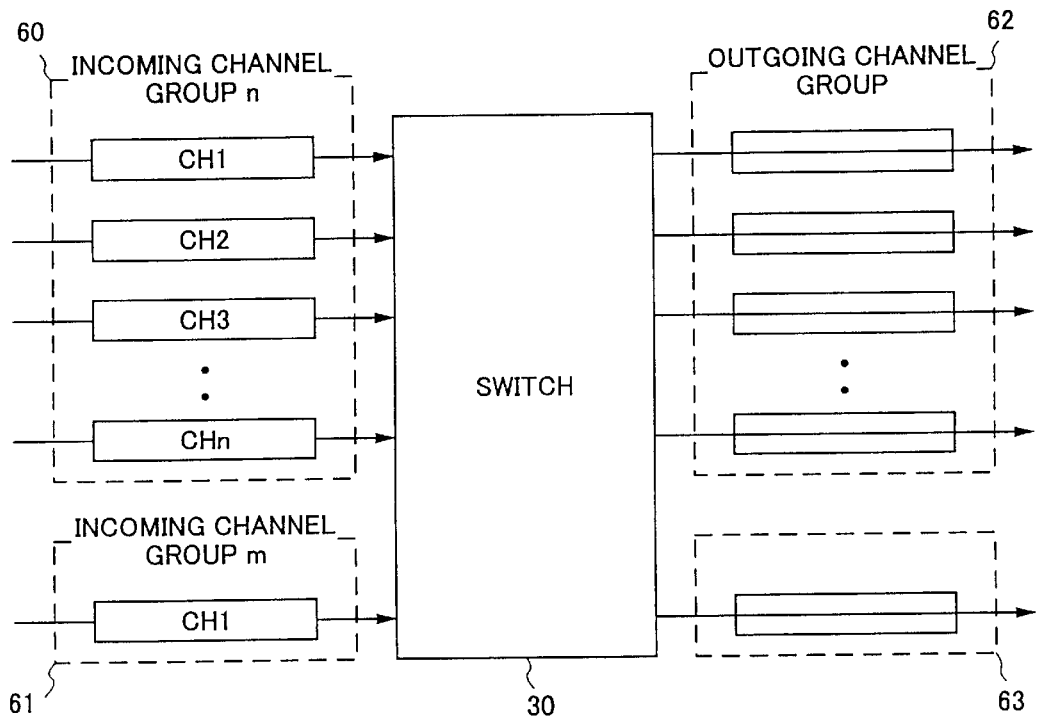
FIGS. 8A and 8B are diagrams describing the repetitive call detection process.

FIG. 7 is a flowchart of the repetitive call detection process. FIGS. 8A and 8B are diagrams to be referred to in conjunction with the flowchart of FIG. 7.

The switch 30 has a respective information management table for each of channel groups 60 and 61. FIG. 8B shows an example of the information management tables. The information management table includes, for each incoming channel, a calling subscriber number, a received number and additional information. At the time of capturing a channel, the calling subscriber number and the received number are written into the information management table. The pieces of data written into the information management table are deleted when the captured channel is released.

The repetitive call detection unit 52 executes step S20 shown in FIG. 7 after the translation process unit 47 completes the translation process. At step S20, the repetitive call detection unit 52 data already registered in the information management table stored in the data storage unit 54. The data thus read from the table are stored in a register or a temporary management memory formed in an arbitrary storage area of the switch 30.

At step S22, the repetitive call detection unit 52 compares the calling subscriber number, the received number (called subscriber number) and additional information of the current call with the data read from the related information management table, and determines whether a channel having the same information as that of the current call is defined in the information management table. If it is determined that there is a channel having the same information as that of the current call (YES at step S22), the repetitive call detection unit 52 proceeds with step S26 at which the current call is registered as a repetitive call in a repetitive call management table by a process executed when a repetitive call is detected. This process will be described later. On the contrary, if it is determined that no channel having the same information as that of the current call (NO at step S22), the repetitive call detection unit 52 proceeds with step S24 at which the calling subscriber number, the received number (called subscriber number) and additional information of the current call are written into the corresponding row of the information management table shown in FIG. 8B.

At step S28, the repetitive call detection unit 52 supplies the MTL management software component 44 with a message output request on the basis of the data on the repetitive call registered in the repetitive call management table. The above may easily be implemented by a function used for general maintenance such as a failure message output function. The maintenance person is notified of occurrence of a trouble.

At step S30 following step S28, the repetitive call detection unit 52 supplies, the information receive/send unit 53, the channel management software component 42 with a request to output information concerning occurrence of a trouble to an adjacent station. Thus, the adjacent station can be notified of occurrence of a trouble.

At step S32 subsequent to step S30, the repetitive call detection unit 52 releases the channel and memory used by the repetitive call. The releasing process can easily be implemented by the existing conventional forced release process.

Figure 9:
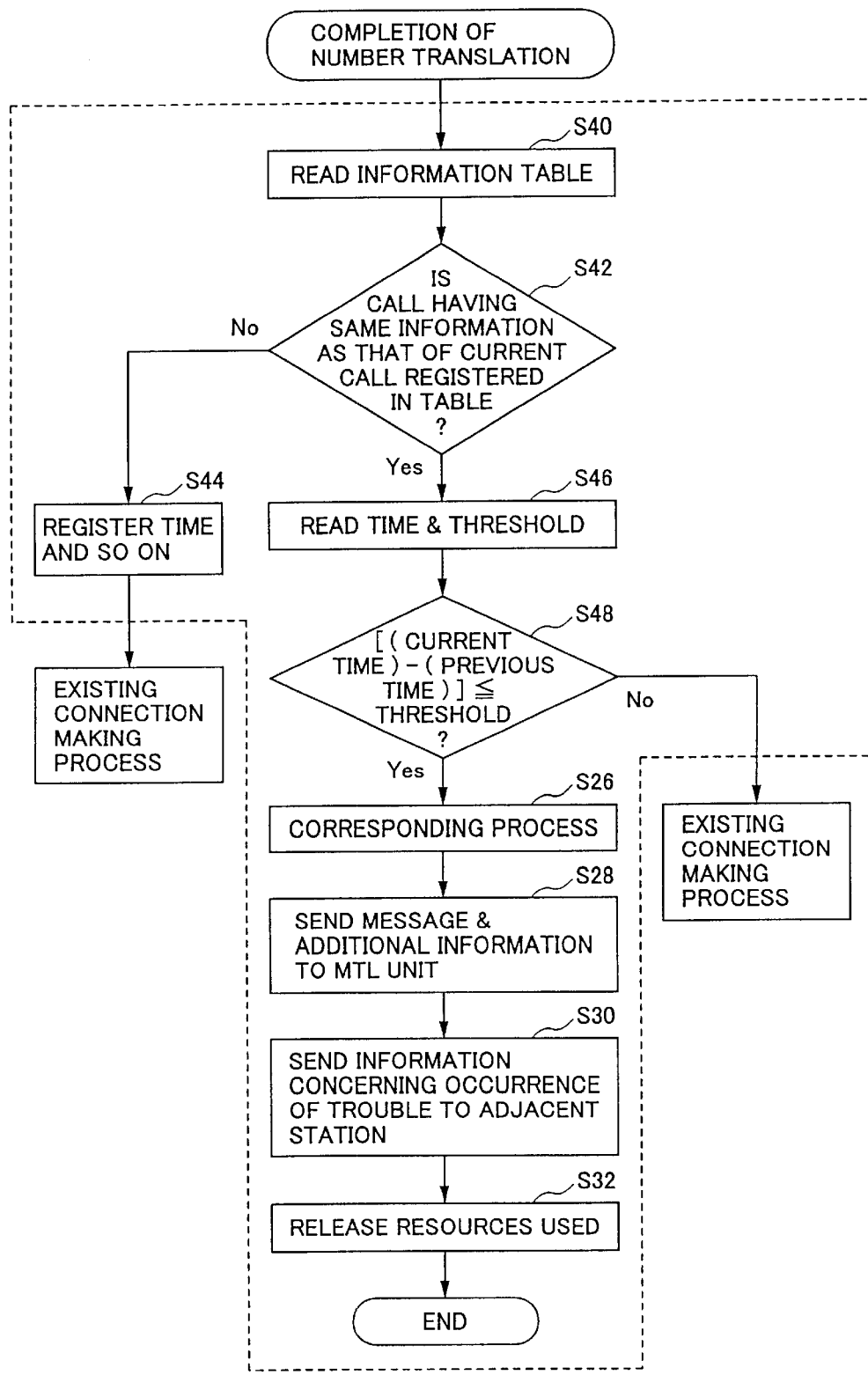
FIG. 9 is a flowchart of another version of the repetitive call detection process.

FIG. 9 is a flowchart of another version of the repetitive call detection process. FIG. 10 shows an information management table referred to the repetitive call detection process shown in FIG. 9. The switch 30 has the information management table shown in FIG. 10. The information management table shown in FIG. 10 includes a calling subscriber number, a received number a request time and additional information with regard to a call initiated. The above pieces of data are written into the information management table when a channel is captured. At the time of releasing the captured channel, the pieces of data are deleted from the information management table.

Referring to FIG. 9, the repetitive call detection unit 52 reads data registered in the information management table stored in the data storage unit 54 after the translation process unit 47 completes the translation process. The data thus read are stored in a register or a temporary management memory formed in an arbitrary storage area of the switch 30.

At step S42 subsequent to step S40, the repetitive call process unit 52 compares the calling subscriber number, the received number (called subscriber number) and the additional information with regard to the current call with the data read from the information management table, and determines whether a call having the same data as that of the current call is defined in the information management table. If the answer of step S42 is YES, the repetitive call detection unit 47 reads, at step S46, the request time of the current call and the request time of the call that has the same data as that of the current call and is read from the information management table (hereinafter referred to previous identical call).

At step S48 following step S46, the repetitive call process unit 52 determines whether the request time of the current call and that of the previous identical call satisfy the following condition:

$$\text{(request time of current call)} - \text{(request time of previous identical call)} \leq \text{(threshold value)} \quad (1)$$

If condition (1) is satisfied (YES at step S48), the repetitive call detection unit 52 executes step S26 at which the current call is registered, as a repetitive call, in the repetitive call detection table as will be described later. In contrast, if condition (1) is not satisfied (NO at step S48), the existing connection making process is performed. Steps S28–S32 shown in FIG. 9 are the same as those shown in FIG. 7.

If it is determined at step S42 that there is no previous identical call, the repetitive call detection unit 52 executes step S44 at which the calling subscriber number, the received number (called subscriber number), the request time and additional information with regard to the current call are registered in the information management table, and proceeds with the existing connection making process.

The employment of the threshold level makes it possible to discriminate a congestion which may be caused at the time of a disaster from an automatic call using the redialing function. For example, it is possible to discriminate repetitive calls from a situation in which a normal call captures an identical channel a plurality of number of times by determining whether condition (2) described below is satisfied:

$$\Delta T > T_{n+1} - T_n \quad (2)$$

where $T_n$ and $T_{n+1}$ are respectively the times of the n and nth requests, and $\Delta T$ is the time interval for redialing.

A description will be given, with reference to FIG. 11, of the repetitive call detection process executed at step S26 shown in FIGS. 7 and 9. FIG. 11 shows an example of the repetitive call management table, which includes pieces of data, namely, a status flag, a calling subscriber number, a received number (called subscriber number), an incoming channel group number, an outgoing channel group number, and additional information.

At step S26, if the pieces of data of the repetitive call currently detected are not the same as those of data of repetitive calls defined in the repetitive call management table, the pieces of data o the repetitive call currently detected are registered in the repetitive call management table. At that time, the status flag is changed to "1" from "0". The status flag is used to perform the repetitive call restriction process, the test call generating process and the repetitive call restriction releasing process.

The trouble notify/receive function will be described. This function is intended to send the information concerning the detected repetitive call to the maintenance person of its own station and the maintenance person of an adjacent station in order to request an appropriate process for the detected trouble, namely, repetitive call. If a repetitive call is detected by the station having the function being considered or if the repetitive call information is received from an adjacent station, the trouble notify/receive function sends the repetitive call information to the MTL management software component 44 via the information send/receive unit 53. Then, the MTL management software component 44 outputs the repetitive call information to a console or the like utilized by the maintenance person.

A part of the trouble notify/receive function involved with a notification to an adjacent station can be implemented by using a common signaling unit included in the channel management software component 42. When the detected repetitive call is discarded or restricted, the trouble notify/receive function sends to an adjacent station the predetermined pieces of data, namely, the calling subscriber number, the received number, the channel group number and a code indicative of the station which detects the repetitive call.

Another part of the trouble notify/receive function involved with a notification from an adjacent station can also be implemented by the common signaling system included in the channel management software component 42. When the trouble notify/receive function receives, from an adjacent station, the calling subscriber number, the called subscriber number, the channel group number, and the detection station code, it sends an associated notification to the maintenance person of its own station, and performs the repetitive call restriction process on the basis of the received information. Thus, even when the station having a cause of the repetitive call differs from the station that detects the repetitive call, it is easy to look into the cause and performs an appropriate process.

Figure 12:
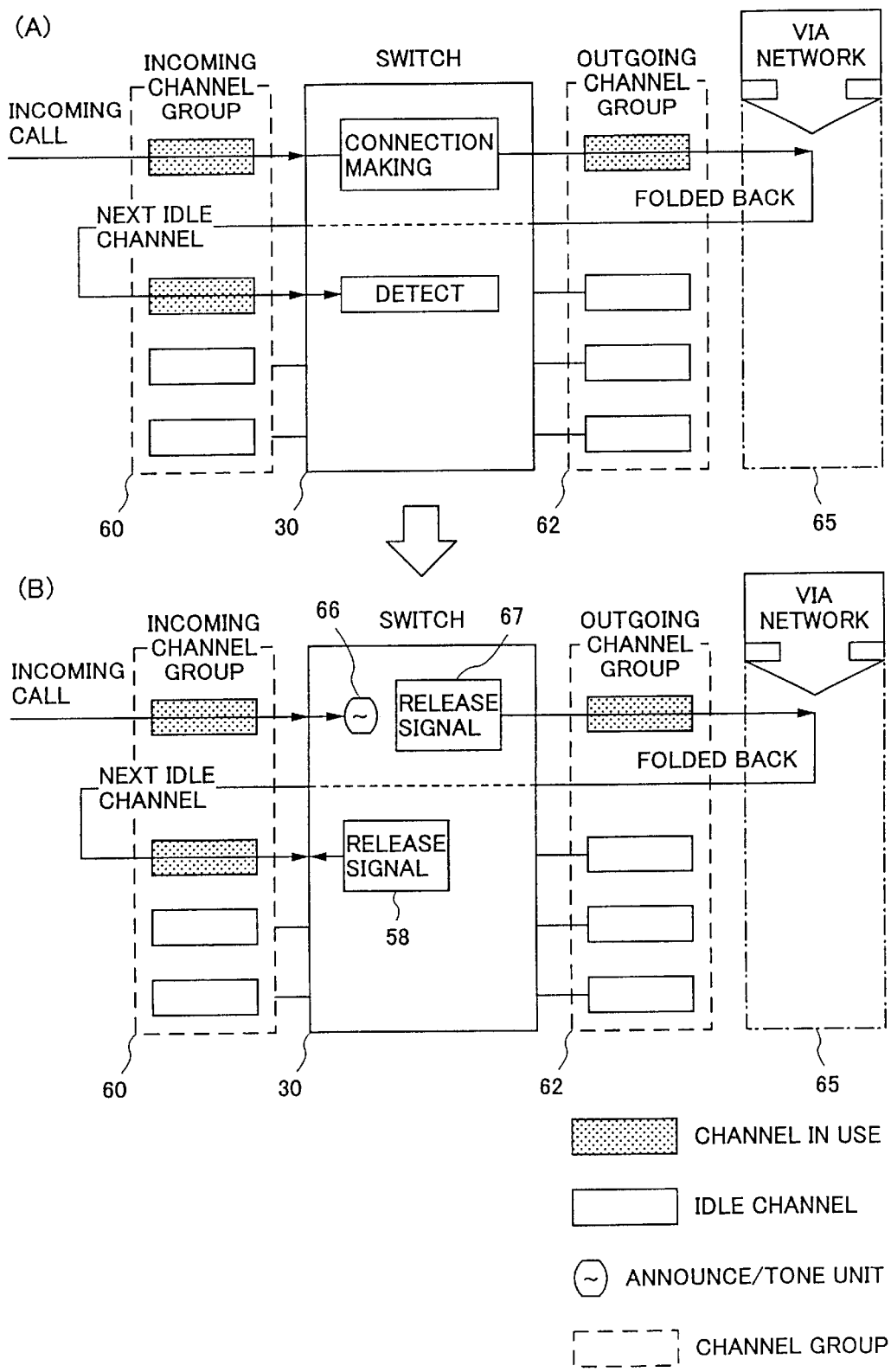
FIG. 12 is a diagram illustrating a function of releasing resources improperly used due to occurrence of a repetitive call.

A description will be given of the function of releasing resources improperly used due to a repetitive call. This function is directed to releasing the improperly used resources associated with the detected repetitive call and makes a connection to an announce/tone unit. FIG. 12 shows the improperly used resource release function.

As shown in part (A) of FIG. 12, the switch 30 receives a call via the input channel group 60. This call is connected to an outgoing channel of an outgoing channel group 62, and is sent to a network 65. Due to a certain cause, the call is folded back. The switch 30 detects, as a repetitive call, the call that is input via another idle channel of the identical channel group 60.

When a repetitive call is detected, as shown in part (B) of FIG. 12, the switch 30 makes a connection to an announce/tone unit at a first-stage connection point 66, so that the calling subscriber is notified of an abnormality in the call by an associated message. A release signal is sent from a second-stage connection point 67 and a third-stage connection point 68 in order to release the channels. Thus, the channels of the second and third stages can be immediately released. The channel of the first stage can be released in response to a release signal from the calling subscriber.

A description will be given of the call restriction function directed to preventing the previous call from recurring. There is a high possibility that the previous call may recur during a time period when the trouble is removed by the maintenance person after the repetitive call is detected. With the above in mind, the call restriction function directed to preventing recurrence of the previous call temporarily imposes a restriction on the questioned call to be connected on the basis of the information concerning the repetitive call registered when this repetitive call is detected. The call restriction function may be implemented by providing the restriction process at step S12 following step S10 at which the number is translated by the translation process unit 47.

Figure 13:
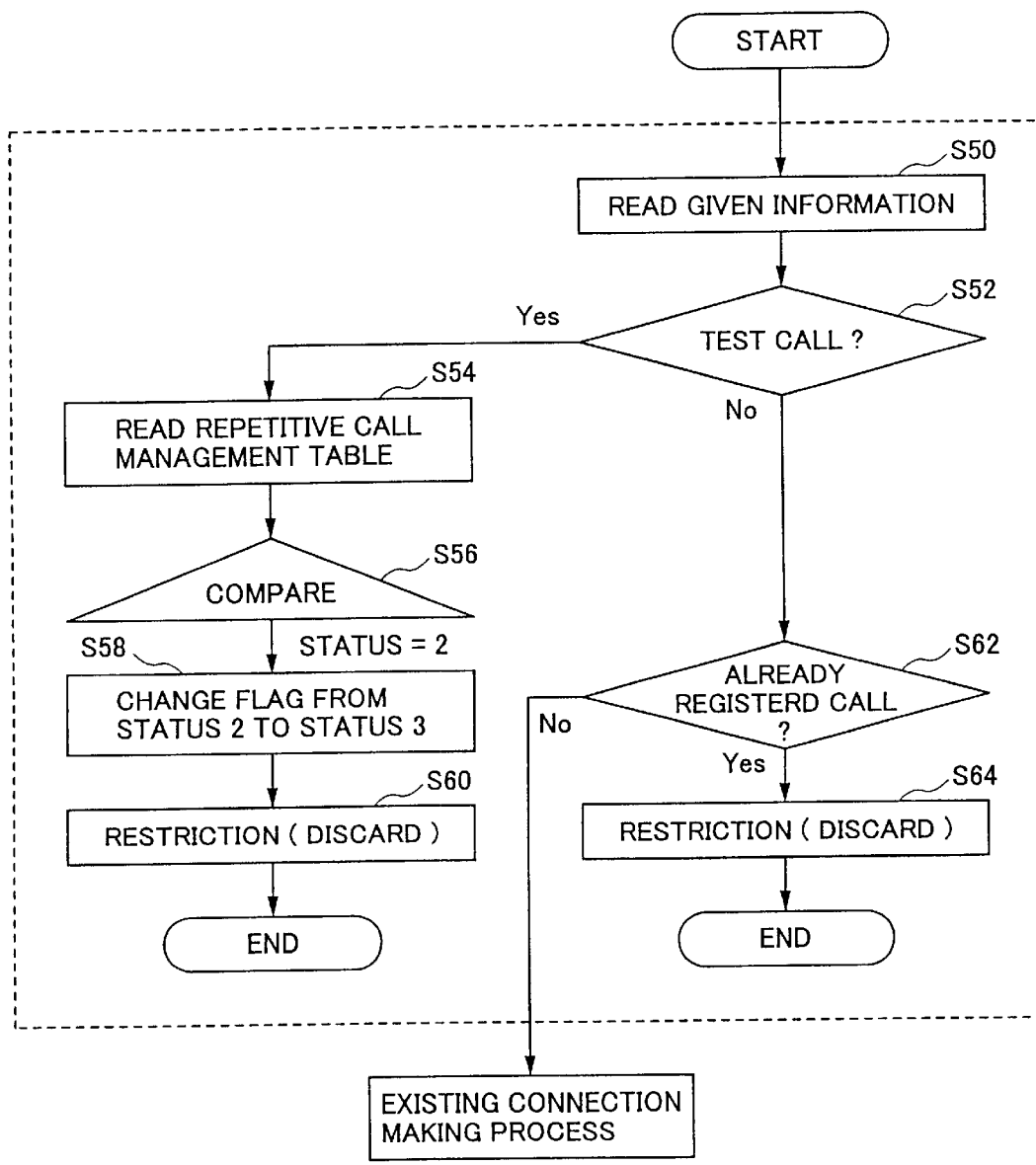
FIG. 13 is a flowchart of a repetitive call restriction process.

FIG. 13 is a flowchart of the repetitive call restriction process. At step S50 subsequent to the number translation process, the restriction process unit 55 reads individual call information managed by the call process software component 40 and a calling subscriber number for a test call stored in the data storage unit 54. The calling subscriber number of a test call will be described later and may be changed by the station or the individual maintenance person. The data thus read are stored in a register or a temporary management memory formed in an arbitrary storage area of the switch 30.

At step S52, the restriction process unit 55 compares the calling subscriber number of the current call with the calling subscriber number of a test call, and determines whether the current call is the test call which was previously sent by its own station. If it is determined at step S52 that the current call is the test call which was previously sent by its own station (YES at step S52), the process proceeds with step S54. In contrast, if the answer of step S54 is NO, the process proceeds with step S62.

At step S62, the restriction process unit 55 determines whether the current call is already registered, as a repetitive call, in the repetitive call management table stored in the data storage unit 54. If the answer of step S62 is YES, the process proceeds with step S64. In contrast, if the answer of step S62 is NO, the existing connection making process is performed.

It is possible to confirm that the current call is not the test call but a repetitive call because it is registered in the repetitive call management table. Thus, the current call is discarded, so that the repetitive call can be prevented from being connected. The process of step S64 can easily be implemented by using the restriction process to be executed at the time of congestion.

If it is determined that the current call is the test call that was previously sent by its own switch, the process proceeds with step S54 at which the restriction process unit 55 reads information concerning the repetitive call corresponding to the current test call from the repetitive call management table. At step S56, the restriction process unit 55 determines whether the status flag contained in the information concerning the repetitive call is "2", which indicates that the test call is being transmitted.

At step S58 subsequent to step S56, the restriction process unit 55 determines that the test call that is the same as the repetitive call, and changes the status flag from "2" to "3", which indicates that the trouble of the repetitive call has not yet been removed. Then, the restriction process unit 55 discards the current call at step S60.

A description will be given of the network test function and the automatic restriction release function. The network test function sends a test call to the network at predetermined constant intervals in a state in which the repetitive calls are restricted, and determines whether there is still factor that causes a repetitive call. The automatic restriction release function releases the call restriction function directed to preventing recurrence on the basis of the results of the network test using the test calls sent intermittently. The network test function can be implemented by newly providing the test call generating process executed by the test call generating unit 51 at step S18 shown in FIG. 6, the repetitive call restriction process executed by the restriction process unit 55 at step S12, and the test call registration data releasing process executed by the restriction process unit 55 at step S16.

Figure 14:
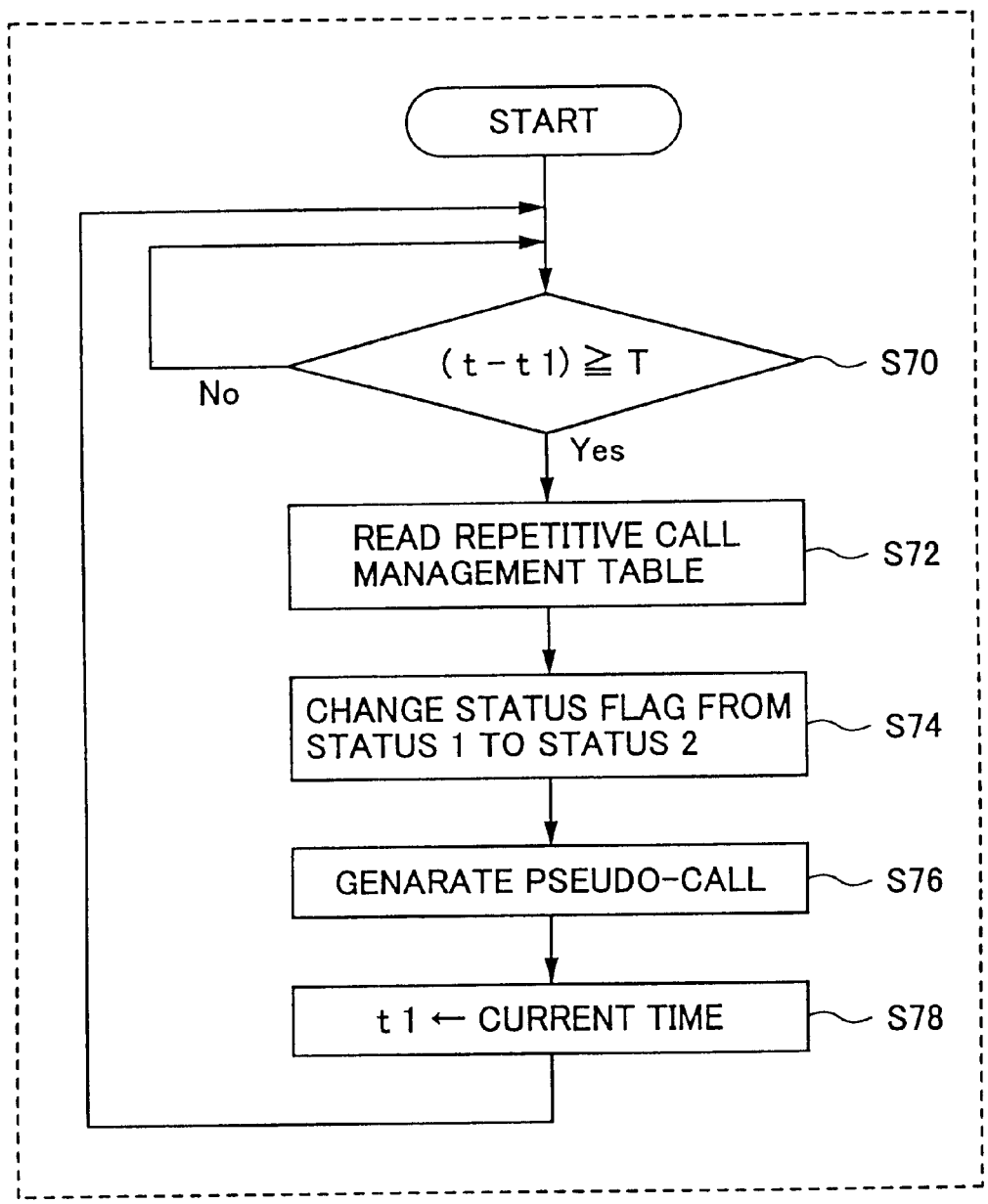
FIG. 14 is a flowchart of a test call generating process.

FIG. 14 is a flowchart of the test call generating process. At step S70, the test call generating unit 51 determines whether a predetermined time (T) has elapsed from the previous test process time (t1), that is, it is determined whether $(t-t1) \geq T$ is satisfied where t is the current time. If the answer of step S70 is YES, the process proceeds with step S72. If not, step S70 is repeatedly performed.

At step S72, the test call generating unit 51 reads information concerning the repetitive calls from the repetitive call management table stored in the data storage unit 54. At step S74, the test call generating unit 51 changes the status flag from "1" (indicating "in restriction") to "2".

At step S76, the test call generating unit 51 causes the channel management software component 42 to issue a pseudo-call in which the called subscriber number registered in the repetitive call management table is described. The process of step S76 can be implemented by a conventional pseudo-call generating unit. At step S78 following step S76, the test call generating unit 51 updates the activation time t1 used in step S70 to be executed for the next time to the current time, and processes step S70.

Figure 15:
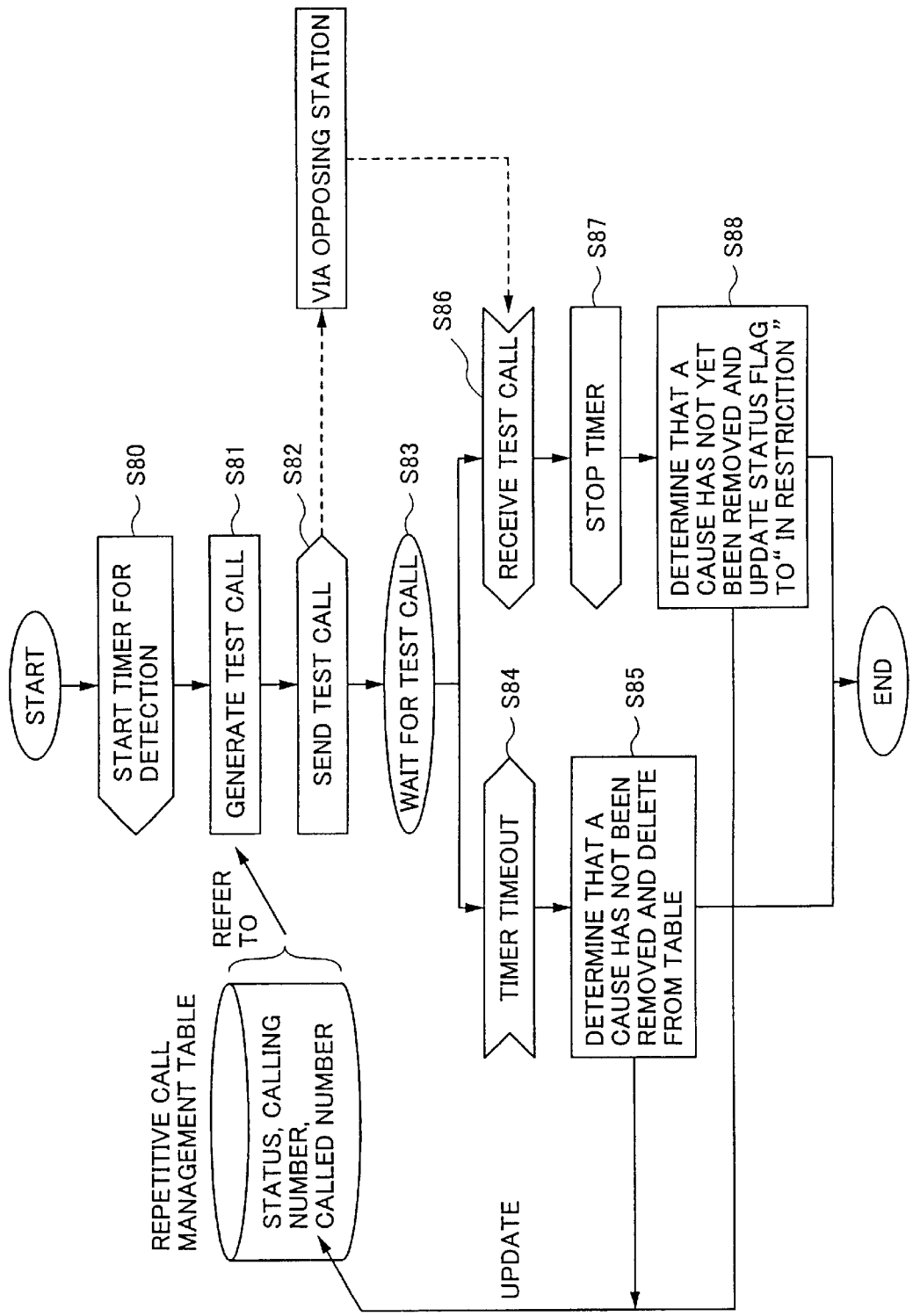
FIG. 15 is a flowchart of a network test function and an automatic restriction release function.

FIG. 15 is a flowchart of the network test function and the automatic restriction release function. At step S80, a time for detection of the test call is initiated. At step S81, the test call is generated in accordance with the test call generating process shown in FIG. 14. At step S82, the test call thus generated is sent to the network.

At step S83, the process waits for detection of the test call. During that time, the timer initiated at step S80 continues to operate. If the test call is not received until the timer measures a given time (time out) at step S84, the process proceeds with step S85. At step S85, it is determined that the factor causing the repetitive cal has been removed because the test call was not received, and the status flag of the associated repetitive call in the repetitive call management table is updated to "0" (no restriction). Then, the information concerning the present repetitive call is deleted from the repetitive call management table.

If the test call is received before the timer measures the given time elapses (step S86), the time is stopped at step S87. At step S88 following step S87, it is determined that the factor causing the repetitive call has not yet been removed, and the status flag in the associated repetitive call in the repetitive call management table is updated to "1" indicating "in restriction".

As described above, the switch 30 has the repetitive call detection function, the trouble notify/receive function, the function of releasing an improperly used resource, the call restriction function for recurrence, the network test function, and the automatic restriction release function.

A further description will be given, with reference to FIG. 16 of the functions of the switch 30.

At step S100, a repetitive call is detected by the repetitive call detection function. At step S101, the maintenance person is informed of information concerning the detected repetitive call. At step S102, a switch station 100 notifies a switch station 110 of the information concerning the detected repetitive call due to the trouble notify/receive function. At step S111, the maintenance person is notified of the information concerning the detected repetitive call. At step S112, a switch station 110 informs a switch station 120 of the information concerning the repetitive call due to the function of the trouble notify/receive function.

The switch station 120 receives the information concerning the detected repetitive call and executes step S122 at which the maintenance person is notified of the information concerning the detected repetitive call due to the trouble notify/receive function.

The switch stations 100, 110 and 120 respectively execute steps S103, S113 and S124 that implement the function of releasing the resources improperly used due to the repetitive call when these stations detect the repetitive call or are notified of the information concerning the detected repetitive call. Further, the switch stations 100, 110 and 120 respectively execute steps S104, 114 and S125 which implement the call restriction function for preventing recurrence.

During that time, the maintenance persons of the switch stations 100, 110 and 120 look into the cause of the repetitive call and remove it. When the cause of the repetitive call is removed, the switch stations 100, 110 and 120 confirm that the cause of the repetitive call has been removed at steps S105, S115 and S126 that are performed at the given intervals. Then, the switch stations 100, 110 and 120 perform steps S106, S116 and S127 that implements the automatic restriction release function, so that the restriction can be released.

Figure 17A:
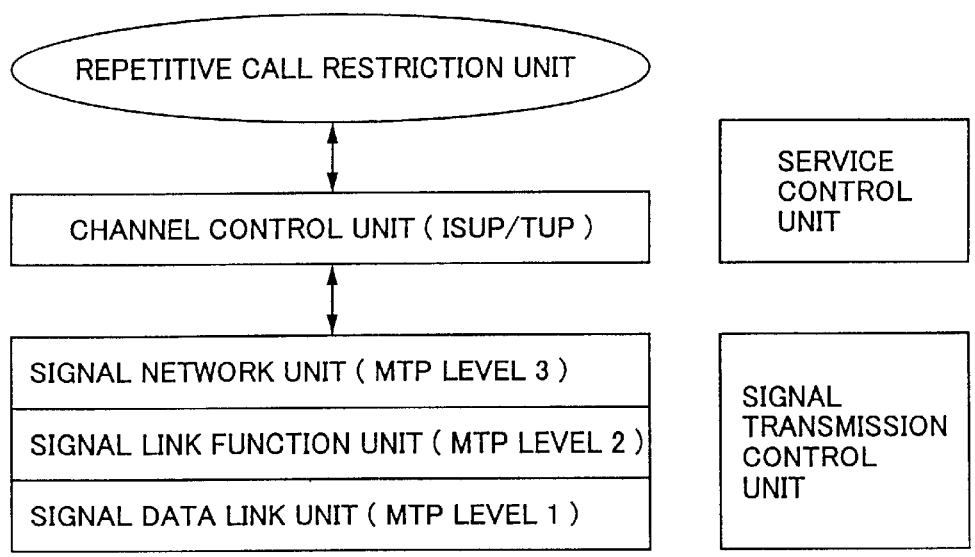
FIGS. 17A and 17B respectively show a unit for notification of information concerning a detected repetitive call and an example of an information format.
Figure 17B:
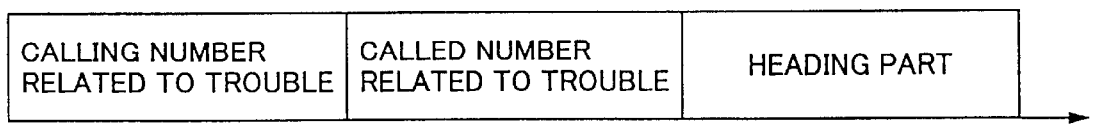

The common signaling system can be used to notify another switch station of the information concerning the detected repetitive call. The common signaling system uses an information format on ISUP/TUP in which the calling subscriber number and called subscriber number of the repetitive call. FIG. 17A shows means for notifying another switch station of the information concerning the detected repetitive call, and FIG. 17B shows an example of the information format.

According to the present invention, it is possible to reduce the number of channels in the identical channel group occupied by a repetitive call and to prevent occurrence of congestion due to the repetitive call.

It is also possible to immediately notify the maintenance persons of the switch stations of occurrence of a repetitive call. Thus, the maintenance persons can cope with the repetitive call. Furthermore, it is possible to prevent the failure from spreading because the call restriction function is enabled until the cause of the repetitive cal is removed.

The present invention is not limited to the specifically embodiments, and variations and modifications may be made without departing from the scope of the present invention.

The present application is based on Japanese priority application no. 11-350491 filed on Dec. 9, 1999, the entire contents of which are hereby incorporated by reference.

What is claimed is:

1. A switch for automatically detecting and imposing a restriction on a repetitive call comprising:
   a repetitive call detection unit which detects a repetitive call which occupies channels in an identical channel group;
   a release unit which releases the channels occupied by the repetitive call when the repetitive call is detected;
   a restriction unit which stores information concerning the repetitive call and imposes a restriction on a connection of a call having information identical to the information concerning the repetitive call;
   a test unit which determines whether a cause of the repetitive call has been removed; and
   a restriction release unit which releases said restriction in accordance with a result of determination by the test unit.

2. The switch as claimed in claim 1, further comprising a notify unit which notifies given positions of associated stations of information concerning the repetitive call detected.

3. The switch as claimed in claim 1, wherein the repetitive call detection unit comprises:
   a first unit which reads call information concerning calls that use the channels from a given table; and
   a second unit which compares the call information read with call information concerning a current call and determines whether the given table defines a call having call information identical to that of the current call, and
   wherein, if it is determined that the given table defines a call having call information identical to that of the current call, the current call is acknowledged as a repetitive call.

4. The switch as claimed in claim 1, wherein the repetitive call detection unit comprises:
   a first unit which reads call information concerning calls that use the channels from a given table; and
   a second unit which compares the call information read with call information concerning a current call and determines whether the given table defines a call having call information identical to that of the current call, and
   wherein, if it is determined that the given table defines a call having call information identical to that of the current call, the current call is acknowledged as a repetitive call in a case where a time interval between a time when said call having identical call information defined in the table occurs and a time when said current call occurs is equal to or shorter than a given time interval.

5. The switch as claimed in claim 3, wherein if it is determined that the current call is a repetitive call, the repetitive call detection unit registers the call information concerning the current call in the given table.

6. The switch as claimed in claim 3, wherein the test unit comprises:
   a test call generating unit generating a test call having call information identical to that of the repetitive call at given intervals;
   a test call sending unit sending the test call to a network to which the switch is connected; and
   a determination unit which determines that a cause of the repetitive call has not yet been removed if the test call is received before a predetermined time elapses and which determines that the cause of the repetitive call has been removed if the test call is not received before the predetermined time elapses.

7. The switch as claimed in claim 6, wherein the determination unit comprises:
   a first unit which registers information concerning a situation in which the cause of the repetitive call has not yet been removed if the test call is received before the predetermined time elapses; and
   a second unit which deletes the call information concerning the repetitive call from the given table if the test call is not received before the predetermined time elapses.

8. A method for automatically detecting and imposing a restriction on a repetitive call comprising the steps of:

detecting a repetitive call which occupies channels in an identical channel group;

releasing, by a release unit the channels occupied by the repetitive call when the repetitive call is detected;

storing, by a restriction unit information concerning the repetitive call and imposing a restriction on a connection of a call having information identical to the information concerning the repetitive call;

determining, by a test unit whether a cause of the repetitive call has been removed; and releasing, by a restriction release unit said restriction in accordance with a result of determination by the test unit.

9. The method as claimed in claim 8, further comprising a step of notifying given positions of associated stations of information concerning the repetitive call detected.

10. The method as claimed in claim 8, further comprising the steps of:

reading call information concerning calls that use the channels from a given table; and comparing the call information read with call information concerning a current call and determining whether the given table defines a call having call information identical to that of the current call, wherein, if it is determined that the given table defines a call having call information identical to that of the current call, the current call is acknowledged as a repetitive call.

11. The method as claimed in claim 8, further comprising the steps of:

reading call information concerning calls that use the channels from a given table; and comparing the call information read with call information concerning a current call and determining whether the given table defines a call having call information identical to that of the current call, wherein, if it is determined that the given table defines a call having call information identical to that of the current call, the current call is acknowledged as a repetitive call in a case where a time interval between a time when said call having identical call information defined in the table occurs and a time when said current call occurs is equal to or shorter than a given time interval.

12. The method as claimed in claim 10, further comprising a step of registering the call information concerning the current call in the given table if it is determined that the current call is a repetitive call.

13. The method as claimed in claim 10, further comprising the steps of:

generating a test call having call information identical to that of the repetitive call at given intervals;

sending the test call to a network to which the switch is connected; and determining that a cause of the repetitive call has not yet been removed if the test call is received before a predetermined time elapses and which determines that the cause of the repetitive call has been removed if the test call is not received before the predetermined time elapses.

14. The method as claimed in claim 13, further comprising the steps of:

registering information concerning a situation in which the cause of the repetitive call has not yet been removed if the test call is received before the predetermined time elapses; and deleting the call information concerning the repetitive call from the given table if the test call is not received before the predetermined time elapses.

* * * * *